United States Patent
Prasad et al.

(10) Patent No.: US 9,852,361 B1
(45) Date of Patent: Dec. 26, 2017

(54) SELECTIVE IMAGE BACKUP USING TRAINED IMAGE CLASSIFIER

(71) Applicant: EMC IP Holding Company LLC, Hopkinton, MA (US)

(72) Inventors: Raghuprasad Prasad, Bangalore (IN); Mahantesh M. Ambaljeri, Bangalore (IN); Amitabh Mehta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/042,022

(22) Filed: Feb. 11, 2016

(51) Int. Cl.
*G06K 9/00* (2006.01)
*G06K 9/62* (2006.01)
*G06F 17/30* (2006.01)

(52) U.S. Cl.
CPC ....... *G06K 9/6267* (2013.01); *G06F 17/3028* (2013.01); *G06F 17/30268* (2013.01); *G06K 9/6256* (2013.01)

(58) Field of Classification Search
CPC .. G06K 9/6256–9/626; G06K 9/6267–9/6287; G06F 17/30268; G06F 17/3028
See application file for complete search history.

(56) References Cited

U.S. PATENT DOCUMENTS

| | | | | |
|---|---|---|---|---|
| 8,565,545 B1 * | 10/2013 | Syed | ................... | G06F 11/1469 382/254 |
| 8,694,466 B2 * | 4/2014 | Rao | ................... | G06F 17/30038 382/232 |
| 9,053,124 B1 * | 6/2015 | Dornquast | ........ | G06F 17/30174 |
| 2008/0118151 A1 * | 5/2008 | Bouguet | ........... | G06F 17/30256 382/181 |
| 2010/0332456 A1 * | 12/2010 | Prahlad | ................. | G06F 17/302 707/664 |
| 2011/0184950 A1 * | 7/2011 | Skaff | ................. | G06F 17/30265 707/737 |
| 2011/0191336 A1 * | 8/2011 | Wang | ..................... | G06F 17/30 707/728 |
| 2013/0290274 A1 * | 10/2013 | Patil | ................. | G06F 17/30156 707/690 |
| 2013/0339848 A1 * | 12/2013 | Patil | ................. | G06F 17/30156 715/255 |
| 2014/0142984 A1 * | 5/2014 | Wright | .................. | G06F 19/321 705/3 |
| 2014/0143247 A1 * | 5/2014 | Rathnavelu | ....... | G06F 17/30247 707/737 |
| 2014/0337591 A1 * | 11/2014 | Guo | .................... | G06F 11/1453 711/162 |
| 2015/0125084 A1 * | 5/2015 | Sundaresan | ....... | G06F 17/30265 382/218 |
| 2016/0180185 A1 * | 6/2016 | Zhang | ................ | G06K 9/00671 382/176 |
| 2016/0232195 A1 * | 8/2016 | Davis | ................. | G06F 17/30371 |
| 2016/0321290 A1 * | 11/2016 | Luthra | ............. | G06F 17/30233 |
| 2017/0068870 A1 * | 3/2017 | Lindholm | ............ | G06K 9/4671 |
| 2017/0140157 A1 * | 5/2017 | Gardner | ............... | G06F 21/602 |
| 2017/0206219 A1 * | 7/2017 | Vijayan | ............. | G06F 17/30156 |
| 2017/0208125 A1 * | 7/2017 | Jai | ...................... | H04L 67/1097 |

* cited by examiner

*Primary Examiner* — Aaron W Carter
(74) *Attorney, Agent, or Firm* — Van Pelt, Yi & James LLP

(57) ABSTRACT

Image backup using a trained image classifier is disclosed. In various embodiments, an image classifier is applied to a plurality of images to identify one or more images to be included in a save set of images. The save set of images are selectively stored to a second location according to one or more policies.

16 Claims, 5 Drawing Sheets

SELECTIVE IMAGE BACKUP USING TRAINED IMAGE CLASSIFIER

BACKGROUND OF THE INVENTION

Devices with the capability of capturing and storing photos have become ubiquitous. A person may take thousands of images on an image-enabled device before the images are backed up to a backup image server. Manually reviewing each image individually and deciding whether to backup the image can be a very time consuming process. It would be useful to selectively backup a set of images to a backup image server.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Image backup using a trained image classifier is disclosed. For a device that stores images, a number of images may accumulate over time to the point such that it becomes a very time consuming process to manually review each image and select which images to backup to a backup server. The techniques disclosed herein may be used to selectively back up only a subset of images comprising a larger set of images, such as only those images determined to satisfy a user-defined selection criteria. As a result, image files are efficiently stored to a backup server without having to review each image individually. A selection of an image is received from a user. The selected image is an image that is used to train an image classifier. Once the image classifier has been trained, the trained image classifier scans one or more file locations to identify images that match the selected image and to create a save set of matching images. The save set of matching images is then stored to a backup location.

Figure 1:
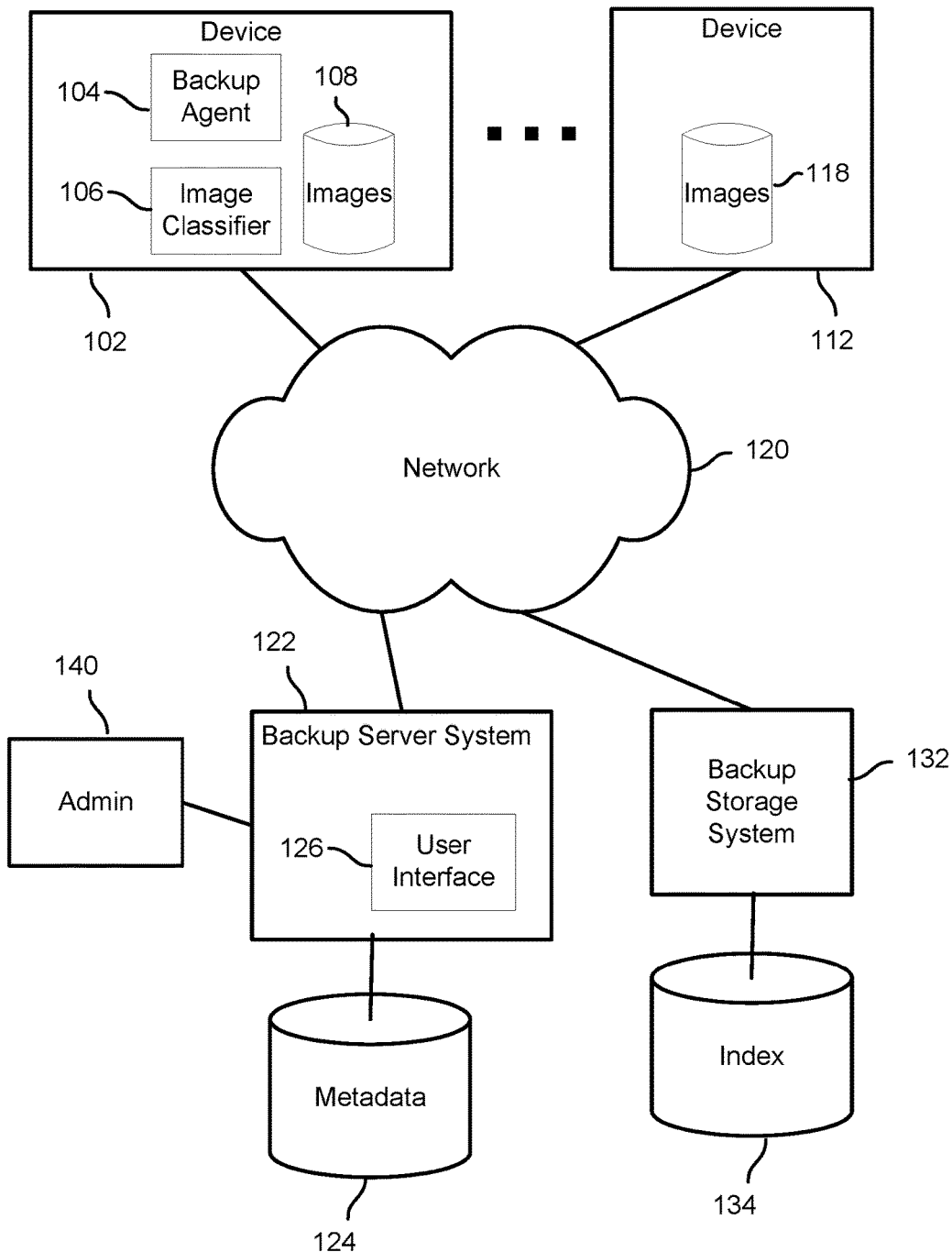
FIG. 1 is a block diagram illustrating an example of a system that backups images using a trained image classifier.

FIG. 1 is a block diagram illustrating a system 100 that backups images using a trained image classifier. In the example shown, the system 100 includes a plurality of devices, represented in FIG. 1 by a device 102 and a device 112, a network 120, an administrator 140, a backup server 122, and a backup storage system 132. Device 102 and 112 may be any device capable of storing images. For example, the devices 102, 112 may be a personal computer, laptop computer, personal digital assistant, server, mobile phone, tablet, etc. Although only two devices are depicted in FIG. 1, in various embodiments the system 100 may have one or more devices storing images.

Device 102 includes a backup agent 104, an image classifier 106, and a memory or the storage device 108 storing images. In some embodiments, the backup agent 104 controls the selective image backup process. In some embodiments, the backup agent 104 receives image selection criteria from a user. The image selection criteria may include a specific object, sub-image, pattern, or face within a larger image. The backup agent 104 provides the image classifier 106 with the image selection criteria. In other embodiments, the backup agent 104 receives the image selection criteria from a system administrator 140 of backup server system 122 via network 120.

To identify the image selection criteria out of a set of images, in various embodiments, the image classifier 106 is trained with a training set of images. Although shown in FIG. 1 as part of device 102, in some embodiments the image classifier may also or instead be located in backup server system 122. The image classifier 106 may be an OPENCV HAAR classifier, a cascade image classifier, local binary patterns (LBP) classifier, LBP cascade classifier, etc. The training set may include a set of positive images and a set of negative images. Positive images are images that include the image selection criteria. Negative images are images that do not include the image selection criteria. The training set of images may be stored in memory 108. The training set of images may be received from another device over the network. The training set of images may also be provided to the device 102 by any form of physical non-transitory media, including, but not limited to memory cards, flash drives, zip drives, floppy disks, etc. Memory 108 may store one or more images in one or more directories. The location of files to be backed up in memory 108 may be specified to the backup agent 104. For example, one or more directories of memory 108 may be specified.

Device 112 includes a memory 118 storing one or more images in one or more directories. The location of files to be backed up in memory 118 may be specified to the backup agent 104. For example, one or more file directories in memory 118 may be specified.

Network 120 connects device 102 to device 112, backup server 122, and backup server system 132. Network 120 comprises one or more of the following: a local area network, a wide area network, a wired network, a wireless network, the Internet, an intranet, a storage area network, or any other appropriate communication network.

User interface 126 is running on backup server system 122. In some embodiments, user interface 126 is operated by a system administrator 140. The system administrator 140 establishes one or more policies regarding how the image data is to be stored. The one or more policies may include policies describing how frequently the save set of images is stored to the second location, how many backups of the save set of images are performed, i.e., storing to multiple storage locations, the type of storage that is to be used to store the save set of images, and how long the save set of images are to be stored. In various embodiments, backups may be specified to be conducted according to a backup schedule, periodicity, or other criteria. For example, the system administrator 140 may establish a periodicity at which images having a certain tag are backed up to the backup storage system 132. The periodicity may be daily, weekly, monthly, yearly, etc. When the system administrator 140 establishes a backup schedule, periodicity, or other criteria (e.g., on occurrence of a specified condition or event) as to when backups are to be performed, the backup server system 122 communicates the backup schedule, periodicity, or other criteria to a control agent 104 of device 102. The control agent 104 may instruct device 102 to backup up images according to a periodic or other schedule or upon request.

In various embodiments, the backup agent 104 is provided with one or more locations storing one or more image files. The one or more locations may correspond to physical and/or logical locations in memory 108 and/or memory 118 storing images. The image classifier may be used to identify from among a set of images stored in the specified physical and/or logical locations one or more matching image files that match the image selection criteria. Images that match the image selection criteria may be tagged with metadata tags. In some embodiments, metadata corresponding to the metadata tags may be stored in metadata 124. The metadata 124 may be a pointer pointing to the image or a tag or other metadata attached to the image as stored on device 102 or 112. Metadata 124 associates the matched image with the image selection criteria. This allows a search of all images with a common image selection criteria to be identified.

Backup storage system 132 stores backup data comprising backups of data stored on devices 102, 112. In various embodiments, backup server system 122 may be configured and/or used to perform full backups of the image data on devices 102, 112 (e.g., makes complete copies of the image data), incremental backups of the data on devices 102, 112 (e.g., makes copies of image data modified since the last backup), a combination of full and incremental backups of the image data on devices 102, 112, or any other appropriate kind of backup. In some embodiments, image data stored on backup storage system 132 is deduplicated (e.g., images are stored in such a way that the same image is not stored multiple times, even if the image is found on one or more devices 102, 112 and/or multiple copies of the same image are stored on a device). For example, the same image may be stored in devices 102, 112. In some embodiments, deduplicated backup data is segmented (e.g., broken into chunks which can then be compared to determine duplicate data).

The images stored in backup storage system 132 are indexed in index 134. In some embodiments, the index may be stored locally to the backup agent 104 or the backup server system 122.

In some embodiments, the index 134 or other data structure is structured or organized for fast or efficient lookup. By pre-indexing the images during a backup process, a user will be able to identify files associated with a particular tag and/or image selection criteria after the backup storage system 132 has completed the backup process. Thus, when a user wants to recover an individual file, a backup or recovery engine does not need to search the entire backup storage system to find the file.

Figure 2:
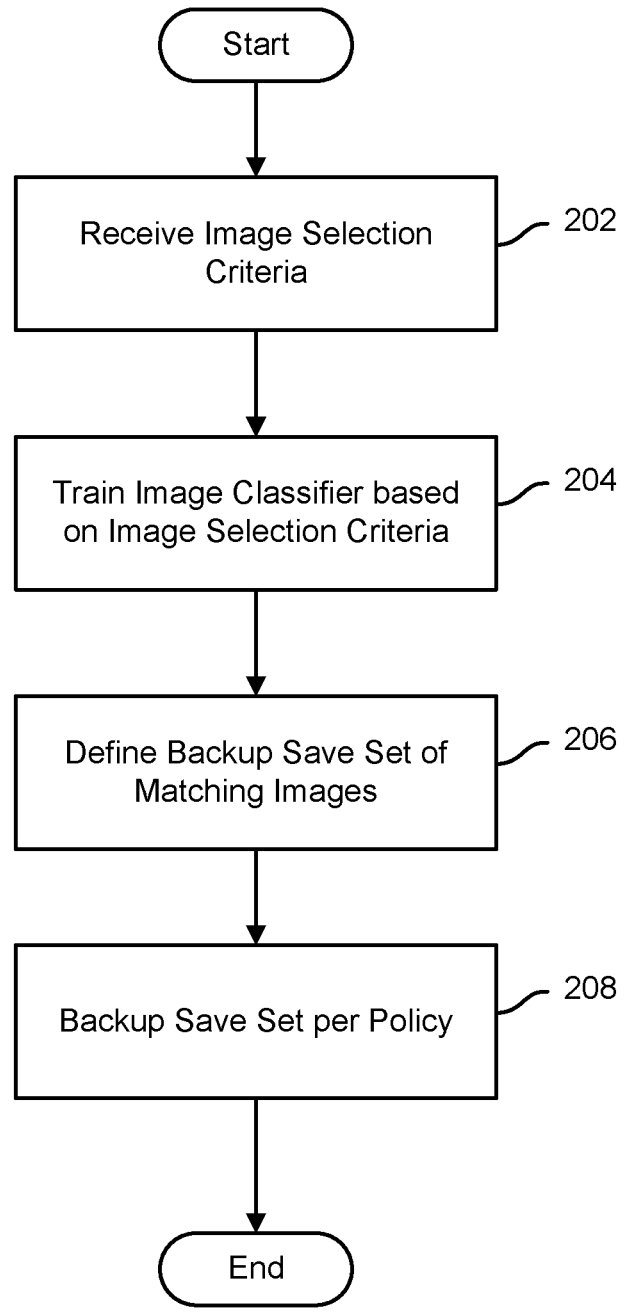
FIG. 2 is a flow chart illustrating an example embodiment of a process to back up images using a trained image classifier.

FIG. 2 is a flow chart illustrating an embodiment of a process to back up images using a trained image classifier.

In step 202, image selection criteria is received, e.g., at a backup agent such as backup agent 104 of FIG. 1. The image selection criteria includes a specific object, sub-image, or face present within a larger image. The image selection criteria may be received from a user via a graphical user interface (not shown) of the device. In some embodiments, a system administrator may interact with a graphical user interface of the backup server system to identify image selection criteria. In response to the user interaction, the backup server system may communicate the image selection criteria to the backup agent.

In step 204, the image selection criteria is used to train an image classifier. The image classifier may be trained with a set of positive images and a set of negative images. The set of positive images may include images that satisfy the image selection criteria. The positive images include images that are cropped to clearly and specifically represent image content that satisfies the image selection criteria. Any number of positive images may be used to train the image classifier. In one embodiment, approximately 40 positive images are used. The set of negative images may include images that do not satisfy the image selection criteria. Any number of negative images may be used to train the image classifier. In one embodiment, approximately 600 negative images are used.

The set of positive images and negative images may be handpicked. The set of positive images may be extracted from video frames of multiple videos featuring the image selection criteria and cropping the frame to focus on the required object or pattern.

In step 206, the trained image classifier is applied to one or more sets of candidate images, e.g., images stored in one or more specific physical and/or logical storage locations. The one or storage locations may include a set of images stored in one or more memories or other storage devices and/or specific portions thereof; images stored in a specified folder, directory, or set of app data, etc. For example, the trained image classifier may be applied to memory 108, memory 118, or both. Memories 108, 118 may have a plurality of images stored on each. Some of the images may satisfy the image selection criteria and other images may not satisfy the image selection criteria. When the trained image classifier is applied to the one or more storage locations, in various embodiments, the image classifier returns a save set of images that satisfy the image selection criteria. A backup save set of matching images is defined, e.g., by tagging, indexing, or otherwise identifying images to be backed up.

In step 208, the save set of images is stored to a second location according to one or more policies. For example, the second location may be the backup server 122 or the backup storage system 132 of FIG. 1. The one or more policies include policies describing how frequently the save set of images is stored to the second location (e.g., daily, weekly, bi-monthly, monthly, bi-annually, annually, etc.), how many backups of the save set of images are performed, i.e., storing to multiple storage locations, the type of storage that is to be used to store the save set of images, and how long the save set of images are to be stored (e.g., one day, one week, one month, one year, until user manually deletes them, etc.).

Figure 3:
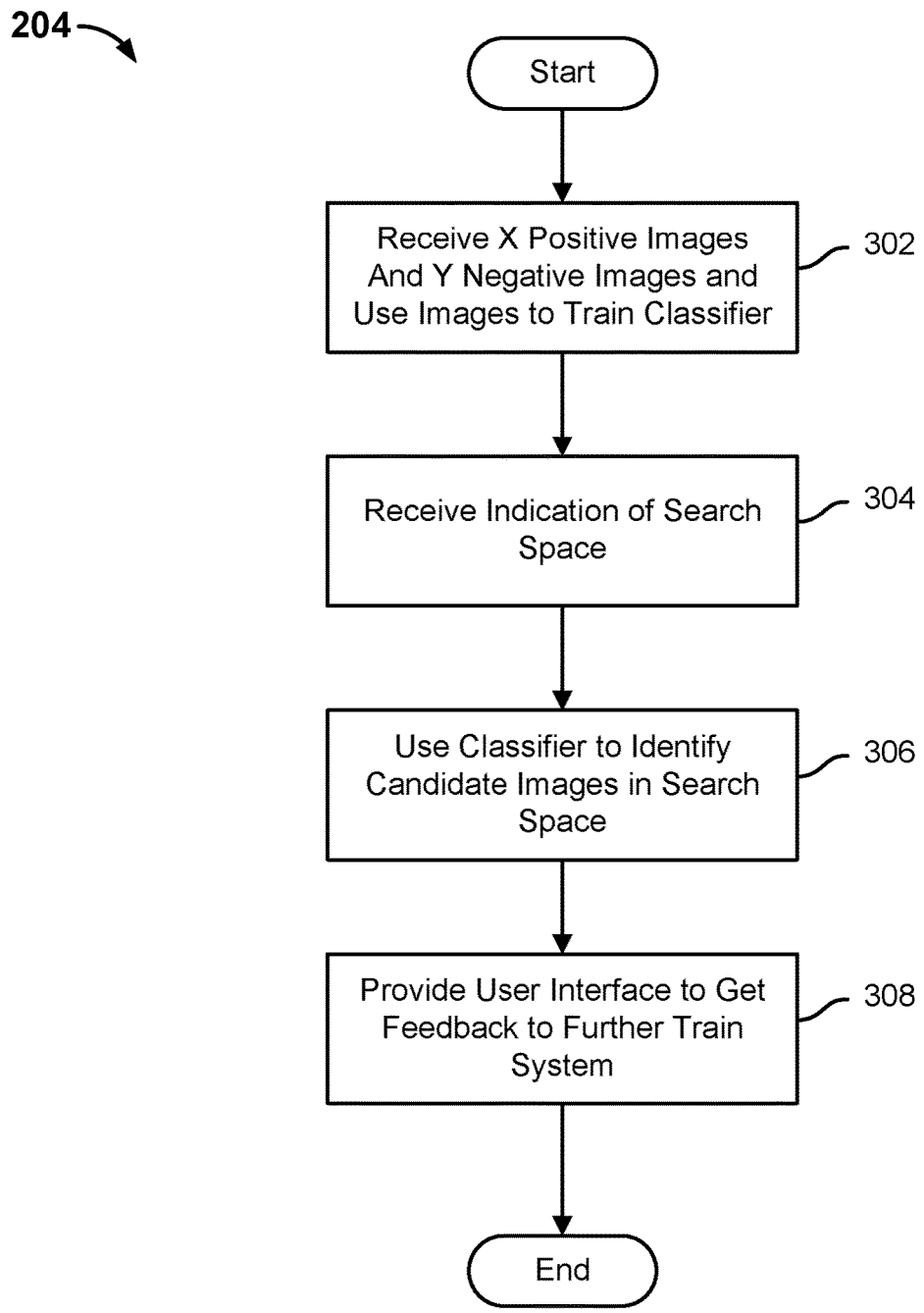
FIG. 3 is a flow chart illustrating an example embodiment of a process to train an image classifier.

FIG. 3 depicts an embodiment of a process to train an image classifier. In various embodiments, the process of FIG. 3 may be used to train an image classifier, such as image classifier 106 of FIG. 1. In some embodiments, the process of FIG. 3 may be performed to implement step 204 of FIG. 2.

In step 302, the set of X positive images and a set of Y negative images are received and used to perform at least initial training of the image classifier. The set of positive images includes images that satisfy the image selection criteria. The positive images may include images that have been cropped to clearly and specifically represent image content that satisfies image selection criteria. Any number of positive images may be used to train the image classifier. The set of negative images includes images that do not satisfy the image selection criteria. Any number of negative images may be used to train the image classifier. In one embodiment, the number of negative images used to train the image classifier is greater than the number of positive images used to train the image classifier.

In step 304, an indication of a search space is received. The search space may include one or more folders spanning across one or more devices. For example, the search space may be one or more folders located on device 102 or it may be a plurality of folders stored in device 102 and device 112.

In step 306, the image classifier as initially trained in step 302 is applied to images stored in the search space and a resulting list of images determined by the classifier to satisfy the image selection criteria is received. The result includes one or more images stored in the search space that have been determined by the classifier to match the image selection criteria.

In step 308, a user interface is provided to a user of device 102. The user determines whether the image classifier correctly returned images that match the image selection criteria. The user may indicate on the user interface that a returned image was incorrectly identified as an image that matches the image selection criteria. This feedback is provided back to the image classifier for training purposes. In some embodiments, the image classifier is subsequently retrained with a second training set taking the user feedback into consideration. In other embodiments, step 308 is performed by a system administrator using an administrative user interface, such as user interface 126 of FIG. 1.

Figure 4:
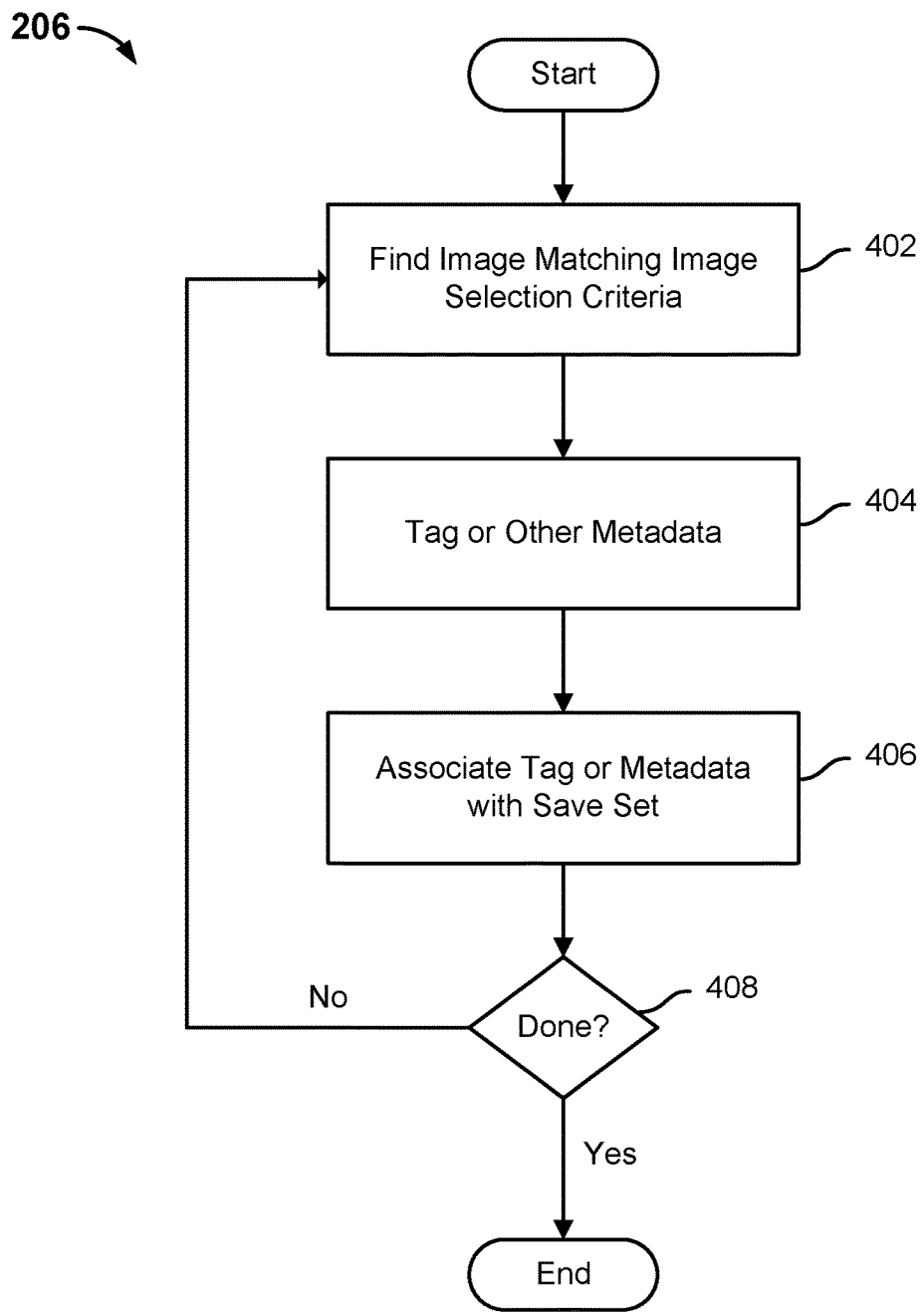
FIG. 4 is a flow chart illustrating an example embodiment of a process of returning a backup save set of matching images.

FIG. 4 depicts a process of returning a backup save set of matching images. In various embodiments, all or part of the process of FIG. 4 may be performed by a backup agent on a device to be backed up, such as backup agent 104 of FIG. 1. In various embodiments, the process of FIG. 4 may be used to perform step 206 of FIG. 2. In the example shown, images determined to satisfy image selection criteria are iterated through and identified by tagging or other metadata as images to be backed up.

In step 402, a first/next image from within the search space that has been determined to match the selection criteria is processed.

In step 404, a tag or other metadata associated with the image selection criteria is created and associated with the image. In various embodiments, image selection criteria may be associated with one or more text-based or other tags. For example, a user may associate the tag "Bob" with a first set of positive images in the training set and the tag "Mary" with another set. Images in which corresponding faces of Bob and/or Mary are recognized may be tagged accordingly. In another example, an image of a dog may be tagged to indicate that the photo includes an image of the owner's pet. The metadata of the image may also be modified to indicate that the photo also includes an image of the owner's child. An image comprising one or more objects may have multiple tags to identify the objects located within the image. The metadata may be attached to the image or a pointer pointing to the images. In some embodiments, the tag or other metadata may associate the image with the backup save set, such as a flag or other value that indicates the item should be backed up. In some embodiments, a pointer, index entry, or other data may be stored, either on the device or at a central location, such as a backup server.

In step 406, the tag or other metadata that has been associated with the image is associated with the save set. For example, a save set definition may be stored that includes a lists of tags. At backup time, the backup server and/or agent may search for and backup images that have associated therewith one of the tags listed in the save set definition and which have changed since a last backup.

In step 408, it is determined if each image in the save set has been tagged or the image's metadata has been modified. If not, the process proceeds to 402 and the next image goes through the process. If yes, then the process ends.

Figure 5:
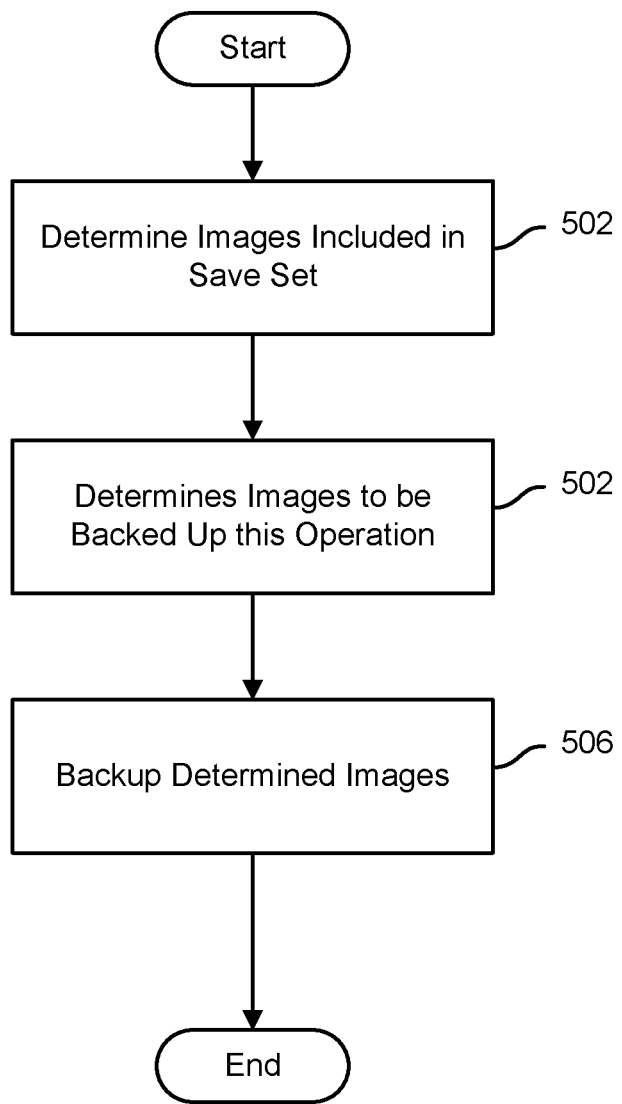
FIG. 5 is a flow chart illustrating an example embodiment of a process to selectively backup images.

FIG. 5 depicts an embodiment of a process to selectively backup images. In various embodiments, the process of FIG. 5 may be performed by one or more of a backup agent and a backup server system.

In step 502, a set of images to be included in a save set is determined. For example, files stored within a search space may be identified as image files, e.g. based on file extension. A subset of images that have been determined to satisfy image selection criteria (e.g., have been tagged with a tag associated with the save set) may be determined.

In step 504, a subset of images that have been determined to be included in the save set but were not backed up previously is determined. This subset of images may include images stored in memory 108 or 118 that satisfy the image search criteria but were not stored in memory the last time images were backed up to the backup storage system 132. For example, if the image selection criteria is an image of a user's child and new images of the child were stored to memory 108 since the last backup, then the new images of the child are included in the save set. In some embodiments, image file metadata (e.g., date/time last modified) and/or backup index data from a prior backup may be used to identify which image files in the save set have been changed (e.g., created, added, copied, modified) since the last backup.

In step 506, the subset of images to be backed up in the current operation is saved to the second location. In the example shown, the subset of images are stored to backup storage system 132.

In various embodiments, techniques disclosed herein may enable a subset of more valued images to be backed up, while other images that do not satisfy image selection criteria are not backed up, which may save time, processing power, network capacity, and/or backup storage capacity that would otherwise be required to back up image data.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
   a processor configured to:
      receive an indication of a search space comprising a plurality of storage locations across a plurality of devices associated with a user, wherein the plurality of storage locations store a plurality of images;
      apply an image classifier to the plurality of images to identify one or more images to be included in a save set of images; and
      selectively store the save set of images to a second location according to one or more policies, wherein the save set of images is deduplicated at the second location that is different than the plurality of storage locations; and
   a memory coupled to the processor and configured to provide the processor with instructions.

2. The system of claim 1, wherein the processor is further configured to:
   receive an image selection criteria comprising an object or pattern within an image; and
   train the image classifier based at least in part on the image selection criteria.

3. The system of claim 1, wherein the processor is further configured to:
   receive an image selection criteria comprising an object or pattern within an image; and
   train the image classifier based at least in part on the image selection criteria, wherein to train the image classifier further includes to receive a set of positive images that correspond to the image selection criteria and a set of negative images that do not correspond to the image selection criteria.

4. The system of claim 1, wherein the processor is further configured to:
   receive an image selection criteria comprising an object or pattern within an image; and
   train the image classifier based at least in part on the image selection criteria, wherein to train the image classifier further includes to receive a set of positive images that correspond to the image selection criteria and a set of negative images that do not correspond to the image selection criteria, wherein the set of positive images are extracted from frames of one or more videos containing the object or pattern.

5. The system of claim 1, wherein the processor is further configured to:
   provide a user interface to allow a user to review the save set of images; and
   receive an indication from the user that one or more images of the save set of images is incorrectly identified as satisfying an image selection criteria.

6. The system of claim 1, wherein the processor is further configured to:
   provide a user interface allow a user to review the save set of images;
   receive an indication from the user that one or more images of the save set of images is incorrectly identified as satisfying an image selection criteria; and
   retraining the image classifier based at least in part on the image selection criteria and the indication.

7. The system of claim 1, wherein the one or more images of the save set of images are identified with a tag or other metadata associated with an image selection criteria.

8. The system of claim 1, wherein the stored save set of images are searchable using at least one of an index, the tag, or the other metadata.

9. The system of claim 1, wherein the processor is further configured to:
   receive an indication to apply the image classifier to one or more storage locations to return a second save set of images; and
   store the second save set of images to the second location according to the one or more policies, wherein the second save set of images does not include images from the save set of images.

10. A method comprising:
   receiving an indication of a search space comprising a plurality of storage locations across a plurality of devices associated with a user, wherein the plurality of storage locations store a plurality of images;
   applying an image classifier to the plurality of images to identify one or more images to be included in a save set of images; and
   selectively storing the save set of images to a second location according to one or more policies, wherein the save set of images is deduplicated at the second location that is different than the plurality of storage locations.

11. The method of claim 10, further comprising:
   receiving an image selection criteria comprising an object or pattern within an image; and
   training the image classifier based at least in part on the image selection criteria.

12. The method of claim 10, further comprising:
   receiving an image selection criteria comprising an object or pattern within an image; and
   training the image classifier based at least in part on the image selection criteria, wherein training the image classifier further includes receiving a set of positive images that correspond to the image selection criteria and a set of negative images that do not correspond to the image selection criteria.

13. The method of claim 10, further comprising:
   receiving an image selection criteria comprising an object or pattern within an image; and
   training the image classifier based at least in part on the image selection criteria, wherein training the image classifier further includes receiving a set of positive images that correspond to the image selection criteria and a set of negative images that do not correspond to the image selection criteria, wherein the set of positive images are extracted from frames of one or more videos containing the object or pattern.

14. The method of claim 10, further comprising:
   providing a user interface that allows a user to review the save set of images; and
   receiving an indication from the user that one or more images of the save set of images are incorrectly identified as satisfying an image selection criteria.

15. The method of claim 10, further comprising:
   providing a user interface that allows a user to review the save set of images;
   receiving an indication from the user that one or more images of the save set of images are incorrectly identified as satisfying an image selection criteria; and
   retraining the image classifier based at least in part on the image selection criteria and the indication.

16. A computer program product, the computer program product being embodied in a tangible non-transitory computer readable storage medium and comprising computer instructions for:
   receive an indication of a search space comprising a plurality of storage locations across a plurality of devices associated with a user, wherein the plurality of storage locations store a plurality of images;
   applying an image classifier to the plurality of images to identify one or more images to be included in a save set of images; and
   selectively storing the save set of images to a second location according to one or more policies, wherein the save set of images is deduplicated at the second location that is different than the plurality of storage locations.

* * * * *